United States Patent [19]

Kerschner

[11] Patent Number: 5,895,928
[45] Date of Patent: Apr. 20, 1999

[54] AUTOMATIC DOCUMENT PRESENCE, WIDTH AND SKEW DETECTION METHOD AND APPARATUS FOR A DOCUMENT SCANNER

[75] Inventor: Ronald K. Kerschner, Loveland, Colo.

[73] Assignee: Hewlett-Packard Company, Palo Alto, Calif.

[21] Appl. No.: 08/877,093

[22] Filed: Jun. 17, 1997

Related U.S. Application Data

[63] Continuation of application No. 08/436,046, May 5, 1995, abandoned.

[51] Int. Cl.$^6$ .................................................. G06K 7/10
[52] U.S. Cl. ............................ 250/559.37; 250/559.39; 358/449
[58] Field of Search ..................... 250/559.37, 559.36, 250/559.3, 559.29, 559.39; 358/449, 448; 355/311, 309, 308

[56] References Cited

U.S. PATENT DOCUMENTS

| | | | |
|---|---|---|---|
| 4,506,301 | 3/1985 | Kingsley et al. | 358/451 |
| 4,544,258 | 10/1985 | Takano | 355/1 |
| 4,648,048 | 3/1987 | Dorn et al. | 364/526 |
| 4,698,511 | 10/1987 | Sueda et al. | 250/560 |
| 4,730,220 | 3/1988 | Wagner | 358/280 |
| 5,091,654 | 2/1992 | Coy et al. | 250/559.29 |

FOREIGN PATENT DOCUMENTS

| | | | |
|---|---|---|---|
| 0041319 | 12/1981 | European Pat. Off. | G06K 7/015 |
| 205087 | 12/1986 | European Pat. Off. | H04N 1/18 |
| 58-079370 | 5/1983 | Japan | H04N 1/02 |
| 60-107661 | 6/1985 | Japan | G03G 15/04 |
| 2142499 | 1/1985 | United Kingdom | H04N 1/00 |

*Primary Examiner*—Edward P. Westin
*Assistant Examiner*—John R. Lee
*Attorney, Agent, or Firm*—Cynthia S. Deal

[57] ABSTRACT

A document scanner method and apparatus is provided which allows for the detection of the presence and size of a document to be scanned. The scanner would also determine whether the document being scanned is crooked. The document scanner includes an automatic document feeder, which feeds the document into the scanner. As the document is being fed into the scanner by the automatic document feeder, an array of CCDs detects the size of the document using a code strip. The CCD signal of the detected document size is then converted to an electronic signal which is sent to application software. The application software then instructs the scanner as to the area to be scanned.

19 Claims, 8 Drawing Sheets

AUTOMATIC DOCUMENT PRESENCE, WIDTH AND SKEW DETECTION METHOD AND APPARATUS FOR A DOCUMENT SCANNER

CROSS REFERENCE TO RELATED APPLICATION(S)

This is a continuation of application Ser. No. 08/436,046 filed on May 5, 1995, now abandoned.

FIELD OF THE INVENTION

This invention relates generally to the field of document scanning, and more specifically to a method and apparatus that is capable of detecting the physical characteristics of a document, such as presence, width and skew of a document being scanned.

BACKGROUND OF THE INVENTION

The technology of document scanning relates to a method and an apparatus whereby the visible image(s) carried by a document is converted to an electronic image signal, for use by a variety of electronic processing means. In accordance with well known techniques, the scanning of a document operates to divide the document into an X-Y matrix comprising a large number of individual picture elements (Pixels) equal in number to X times Y. The scanner apparatus generates an electronic image signal for each document PEL.

The document's visual image is converted into an image signal by the scanning process. This image signal can be used in many ways. For example, the image signal can be transmitted to remote locations for storage or for reproduction by a printer, or the image signal can be manipulated in a manner to enhance or change the image, or the image signal can be merged with other image signals.

When a document is scanned, the entire document must be scanned to make sure that all of the visual image thereon is "read" and "stored" by the scanner. However, if an area larger than the actual document is scanned, the scanning throughput of the scanner is decreased, i.e., scanning time is wasted. Moreover, when an area larger than the actual document is scanned, scanner memory is wasted storing excess information, usually black or white space. One solution to this in the field of copier machines has been to preprogram the copier for three or four of the more common document sizes. However, this solution does not cover all possibilities and has not yet been transferred to facsimile machines or to data entry scanners for computers. Another solution that some manufacturers have developed is a scanner with discrete photoswitches along the width of the document path. This solution is not very advantageous, as it can only be used with an automatic document feed scanner and not with a stationary document scanner, since the document must pass under the vein of the photoswitch and physically trip the switch. Also, the resolution of the system would be restricted to the number of photoswitches. The photoswitches would add significantly to the cost of the scanner and reduce the overall product reliability.

Accordingly, there is a need for a scanner that can detect the exact size of the document to be scanned and only scan the exact area of the document, and thus not waste any scanning time or storage memory by scanning area outside of the actual document being scanned. It would be preferable to accomplish the above goal(s) by adding as few mechanical components to the scanner as possible, in order to keep the overall cost of the scanner down and to keep the mechanical reliability of the scanner high. There is also a need for a system to detect the presence of a document in the scan path and a system to detect whether or not the document in the scan path is crooked (page skew).

SUMMARY OF THE INVENTION

It is an aspect of the present invention to provide a method and apparatus for detecting the presence of a document to be scanned, the actual size of the document to be scanned and to then scan the actual area of the document as detected. Such a system would also determine whether the document being scanned is straight or not.

The above and other aspects of the present invention are accomplished in a system that senses the presence of a document, senses the width and/or the length of a document using photosensors or the scanner's CCDs (Charged Coupled Devices) as the document is being fed into the scanner by an automatic document feeder. The width and/or length that is sensed is then converted into an electronic signal and sent to application software, which then controls the actual area scanned by the scanner. The preferred embodiment of the present invention detects the width and/or length of the document to be scanned as the document is fed into the scanner by the automatic document feeder using the scanner's CCDs and a grey and white code strip. The detected CCD signal is then converted to an electronic signal and sent to the application software. The application software then instructs the scanner as to the size of the paper to be scanned. As the document is being scanned, the skew is continually being determined.

Document scanners are conventionally provided with a generally horizontal, flat, glass platen on whose upper surface a document is placed, image side facing down, for scanning. The document can then be scanned by moving a line of light, or a linear footprint or zone of light, relative thereto, or moving the document relative to a stationary light footprint. The present invention will be described with reference to a moving document, stationary light type scanner. However, it is to be understood that the invention is not to be limited to this particular type of scanner.

The present invention is also described while making reference to a document that comprises a generally opaque substrate (i.e., a sheet of white paper) that contains an image of contrasting, humanly perceptible, image thereon. However, the spirit and scope of the invention is not limited thereto. For example, the present invention finds utility where the document is of any CCD detectable, substantially opaque material. It will be readily appreciated after the below description that various embodiments of the present invention will be appropriate for automatic document feeder scanners as well as stationary document, moving light source, document scanners.

BRIEF DESCRIPTION OF THE DRAWINGS

The above and other objects, features, and advantages of the present invention will be better understood by reading the following more particular description of the invention, presented in conjunction with the following drawings, wherein.

DETAILED DESCRIPTION OF THE PRESENT INVENTION

Figure 1:
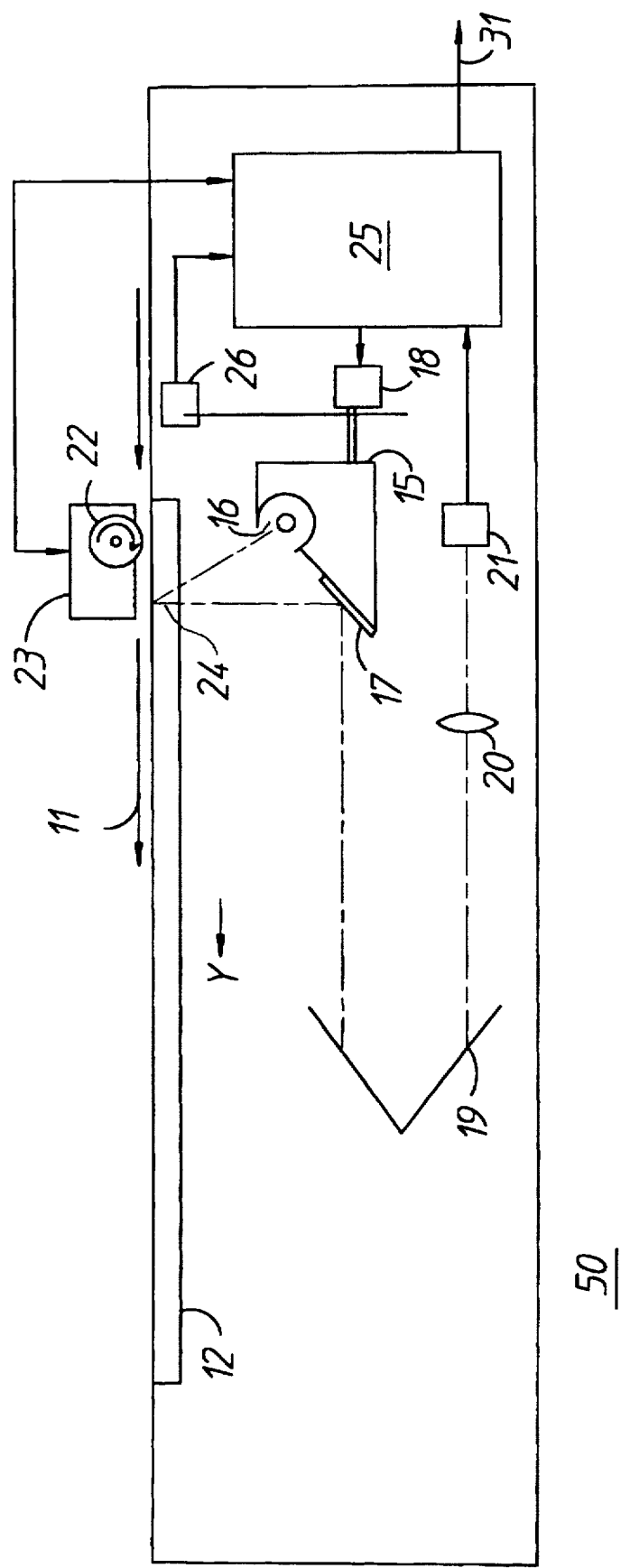
FIG. 1 shows a side cut-away view of a document scanner according to the first embodiment of the present invention.

In the description of the present invention, the document scanner may be either an automatic document feed (ADF) scanner, a stationary document scanner with a moving light source, or a combination of both an ADF and a moving light source document scanner. Before the present invention is described, a stationary document scanner and an automatic document feed scanner will be described. FIG. 1 shows a document scanner 50 with document 11 moving across transparent platen 12 with its visual image facing down. Without limitation thereto, document 11 typically comprises a black image on a white background. The document 11 is scanned, so as to convert the black visual image contained thereon into an electronic signal image that is useable by data processing machines, hard copy production, and the like.

For the stationary document scanner with a moving light source system, the scanning process, the details of which are not critical to the present invention, is accomplished by a moveable carriage 15 that contains a light source (scan bar) 16 and a cooperating reflecting mirror 17. Motor 18 is mechanically coupled to carriage 15, as by gears, cables or the like, to move carriage 15 in the Y scan direction, along the length of platen 12. The light reflected from the document is redirected by moveable corner mirror 19 into lens 20 and thence into sensor array 21. A maximum amount of light is typically reflected from the document's white background areas, whereas a minimum amount of light is reflected from the document's dense black image areas. In an alternate embodiment of the invention (not shown), light source 16, a system of reflecting mirrors, lens 20 and sensor array 21 are all mounted at fixed positions on movable carriage 15.

Sensor array 21, without limitation thereto, is preferably a charge coupled device (CCD) that is configured as a linear array of discrete light sensitive cells or light detector cells, each of which defines a document picture element (PEL). CCD's which can distinguish 300 or more PELS or cells per inch on the document provide good quality resolution and are readily available from contemporary commercial sources. Light source (scan bar) 16 is constructed and arranged, in a manner well known to those skilled in the art, to produce a line of light, linear zone of light, or light footprint 24 on platen 12. Light footprint 24 extends in the X direction relative to document 11, perpendicular to the above defined Y scan direction. Each incremental position of light footprint 24 defines a row of document PELS. As footprint 24 moves (i.e. as the document is scanned and light footprint 24 moves in the Y direction) the document is broken down into a number of parallel rows that extend in the X direction, each row being a large number of document PELS in length. An electrical signal of sensor array 21, which represents the document image, is periodically read out, document row by document row, as carriage 15 moves in the Y direction relative to document 11 on platen 12. Controller 25 receives position information from tachometer position detector 26 and provides drive control signals to motor 18 (which can also be accomplished with a stepping motor) and also outputs electrical image signal 31.

Figure 2:
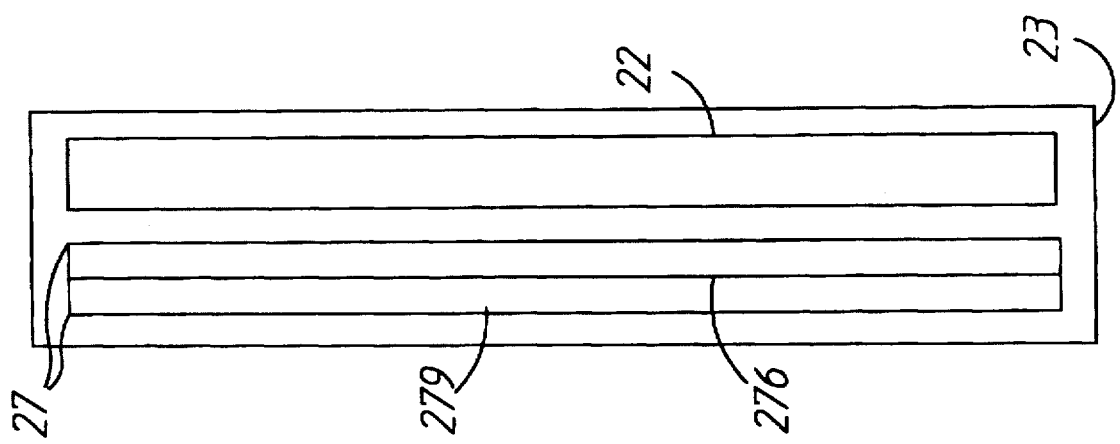
FIG. 2 shows a bottom view of an automatic document feeder according to the first embodiment of the present invention.

If scanner 50 is used in the automatic document feed mode, than document 11 is grabbed by roller 22 and moved across platen 12 as it is being scanned by stationary scan bar 16 rather than carriage 15 moving scan bar 16 across platen 12 as described above for the stationary document scanner with a moving light source. The rest of the scan process is similar to that for the stationary document scanner with moving light source as described above. As shown in FIGS. 1 and 2, the present invention includes a black, grey (or any color other than white) strip 27b and a white calibration strip 27a which are attached to the automatic feed carriage 23.

Figure 8:
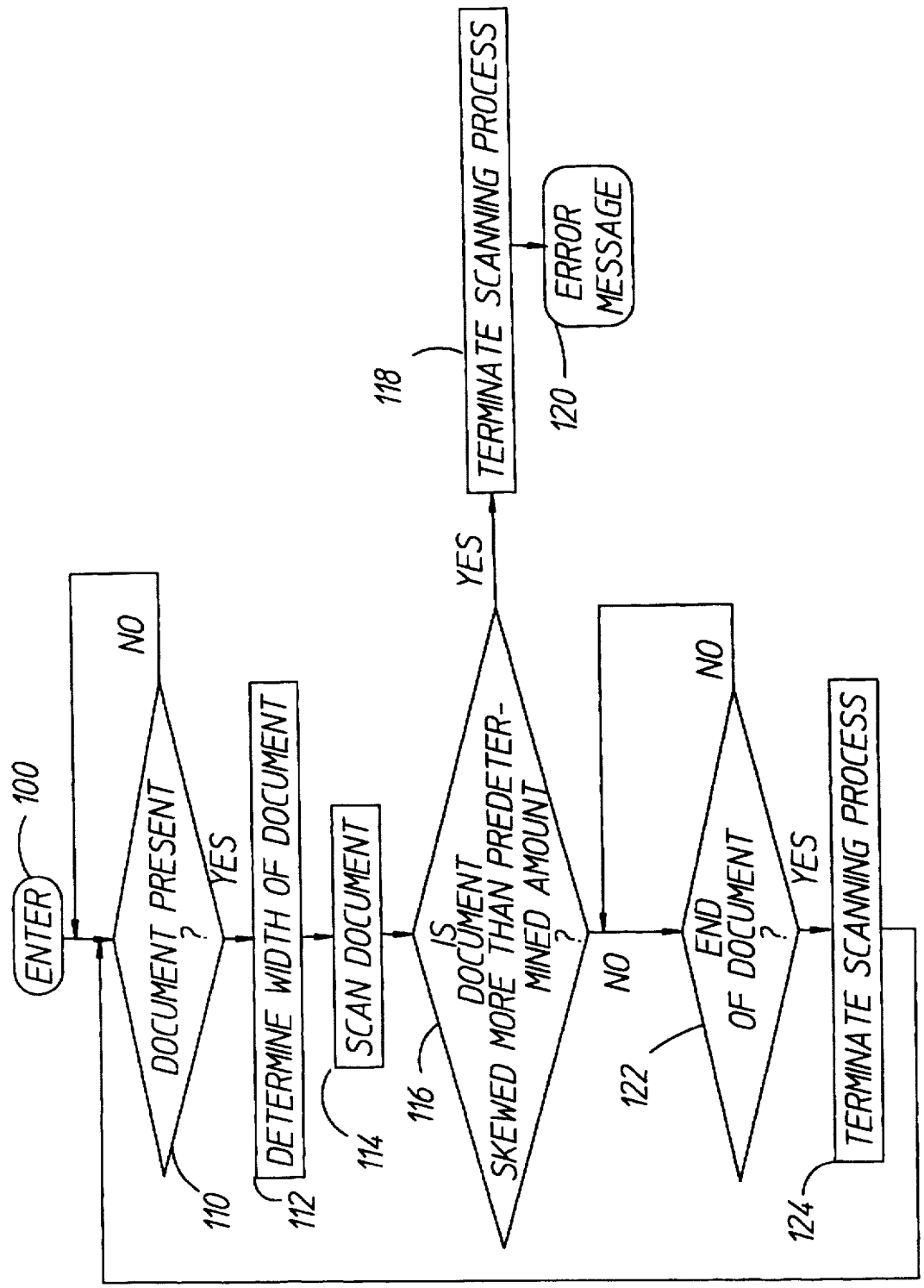
FIG. 8 shows a flow chart of the process of scanning a document by the scanning method of the present invention.

In operation, page presence and page width are determined by the following procedure, as illustrated in FIG. 8. The ADF senses the presence of document 11 by having scan bar 16 continually or periodically "read" color strip 27b and white strip 27a (block 110). When the presence of a document is sensed, document 11 is fed forward between the color strip 27b and the platen 12 until either a signal transition is observed or the document 11 has moved a given distance. If the signal transition is observed than the page width can be measured by detecting where the signal goes light to dark on each edge of the document (block 112). If a signal transition is not observed after moving document 11 a given distance, then document 11 must be dark and scan bar 16 is then moved under the white strip (the normal scan position) and the document is advanced until a signal transition is sensed. The width data is sent by controller 25 to application software which returns a signal to the controller as to the pixels that do not need to be scanned, because they are outside the width of document 11. Scan bar 16 is moved under the white strip and the sensor is calibrated with the white strip. Document 11 is advanced and scanned (block 114).

While document 11 is being scanned, a few pixels just outside of the width of document 11 are periodically "read" to determine whether the document is skewed (block 116). If the document is being fed with a skew greater than a predetermined skew, the controller will stop the scan process (block 118) and send an error message to the user (block 120). It should be noted that if the document is white, the scan bar should be under the color strip during the scan process in order to detect skew. Simiarly, if the document is dark, the scan bar should be under the white strip during the scan process in order to detect skew.

If the present document is the last document to be scanned, the process starts over by waiting for a document to be sensed (blocks 124 & 110). If the document is not the last document in the document tray, the process continues from the calibration step.

The advantages of this invention is that the color strip 27b and white strip 27a would have a relatively low manufacturing cost and the accuracy of the page width measurement is limited only to the pixel resolution. The disadvantage is that the color strip may show through some thin documents when the scanner is used in this mode of operation, especially for a black, dark grey or other dark color strip. To overcome this disadvantage, the color strip can be replaced with a code strip having a fixed distance code or bar pattern having a reflectivity of approximately 95% of the reflectivity of the white strip, preferably a yellow code bar or a code bar of a shade of grey of approximately 95% reflectivity of the white strip. The process proceeds similar to the color/white strip process described above. Specifically, the scanner senses the document 11 and moves the scan bar 16 under the code strip. The paper is advanced until part of the coded signal detected disappears in the central area of the code strip. The document's width is calculated by measuring the position of the beginning pixel of the coded signal on either side of the missing signal in the central area of the code strip. The width data is sent by the controller to the application software and a signal is returned to turn off the pixels outside of the document's width. The scan bar is moved under the white calibration strip and the detector is calibrated. The document is scanned. If this is the last page, the process resumes at the beginning by waiting for a document to be loaded. If this is not the last page, the process continues from the calibration step.

Page presence and skew detection are the same as for the color/white strip above. However, it should be noted that if skew detection is desirable, after the detector is calibrated and before scanning begins, the scan bar should be moved back under the code strip in order for skew detection to be performed.

The inventor has found that this design is less sensitive to thin documents having show through when used in this mode. It is believed that an OCR (Optical Character Recognition) will have problems if the show through is more than 10 bits above the noise floor. Experiments have shown that the amplitude is more like 3–4 bits with 16 lb. paper. This code strip will have a relatively low incremental manufacturing cost. However, the resolution is limited to the spacing of the coded pattern of the code strip 27b. Both of these strips (color/white strip and coded/white strip) minimize manufacturing costs and potential reliability problems, because they add very few hardware elements and use the scanner's detector as the sensing device.

To utilize this invention in a stationary document scanner with a moving scan bar, the color/white strip or coded/white strip would be positioned on the scanner cover (not shown) over the position where document scanning begins so that the strip overlaps the document. Then when the scan begins, the scanner will advance until the coded signal is detected and then a central area of the coded signal disappears. Then the procedure would continue as described above, except instead of the document being advanced, the scan bar 16 moves across the area to be scanned. Page presence and skew detection are the same as described above.

Figure 3:
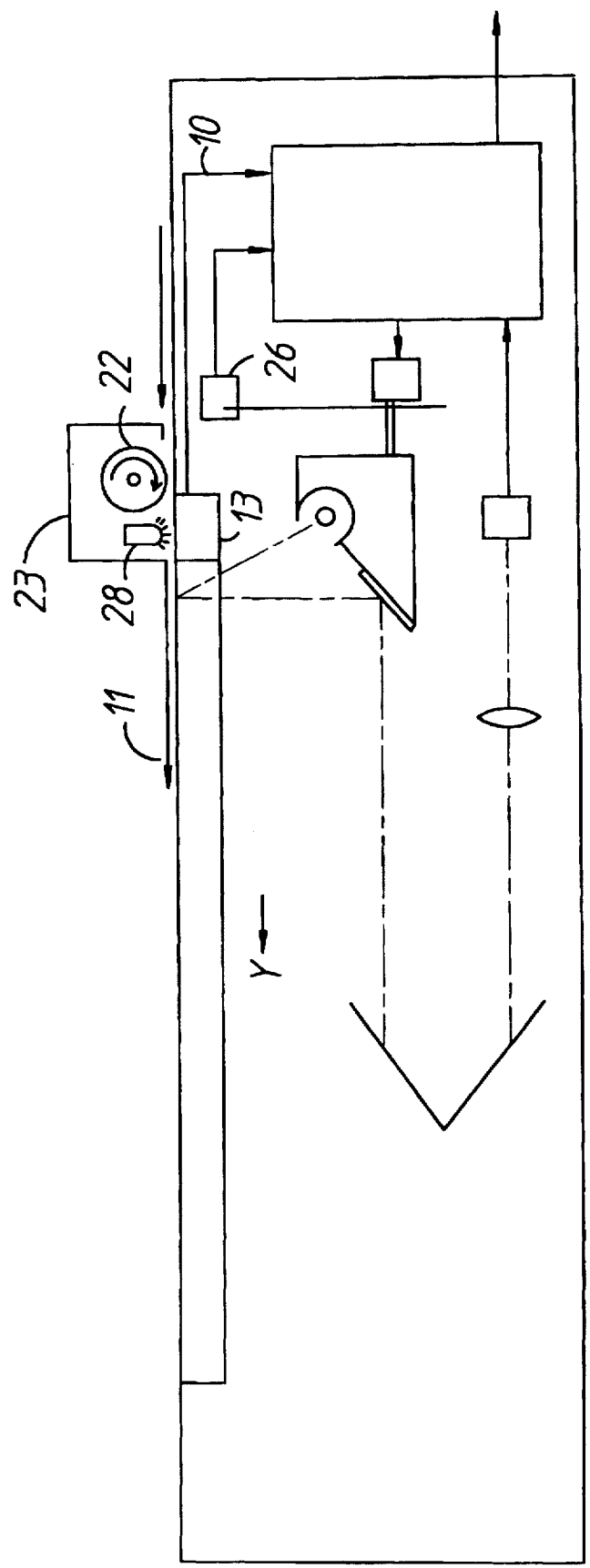
FIG. 3 shows a side cut-away view of a document scanner according to the second embodiment of the present invention.
Figure 4:
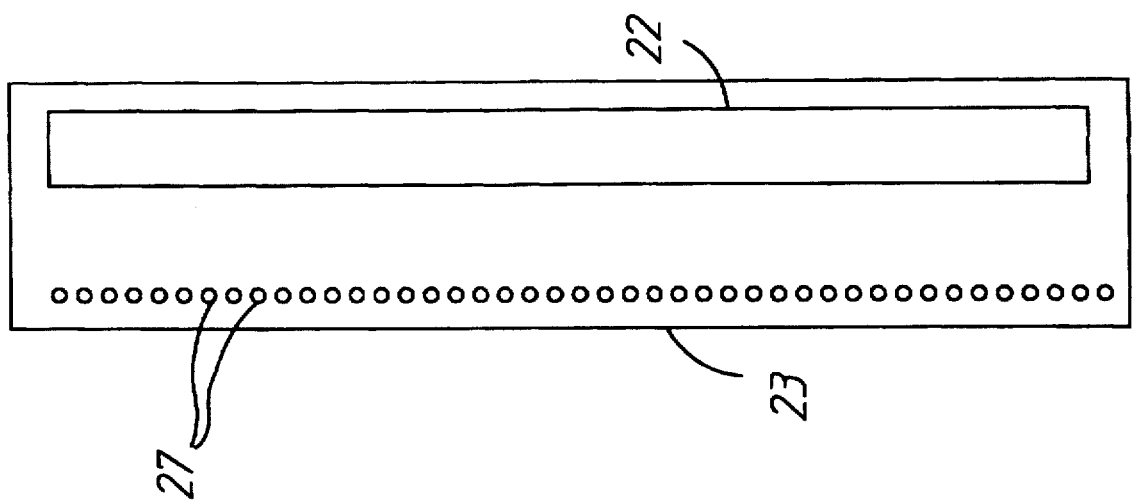
FIG. 4 shows a bottom view of an automatic document feeder according to the second embodiment of the present invention.

FIGS. 3 and 4 show a second embodiment of the present invention. Particularly, code strip 27 is replaced with a row of light sources 28, such as leds and a row of photodetectors 13. The row of light sources 28 are positioned on carriage 23 and facing toward the platen glass 12. The row of photodetectors 13 are positioned immediately adjacent to the platen glass 12 and facing toward carriage 23. Photodetectors 13 would then be coupled to controller 25. In operation, the ADF senses the presence of document 11 and forwards document 11 to just between the row of light sources 28 and the row of photodetectors 13, the width of the page is measured by detecting the light on either edge of document 11 from light sources 28. This width data is then sent by the controller 25 to application software and the pixels which do not need to be scanned because they are outside the width of the document are determined. Document 11 is then advanced and scanned.

In order to implement this embodiment into a stationary document scanner, row of light sources 28 would have to be positioned over mirror 17 when carriage 15 is at the beginning of the scan cycle. When the scan is initiated, row of light sources 28 would be activated, the light on either side of document 11 would be reflected by mirrors 17 and 19, pass through lens 20 to sensor array 21 which would send a signal to controller 25 as to the width of document 11, and the appropriate CCDs corresponding to the pixels outside of the width of the document to be scanned would be turned off and the scan would begin with carriage 15 moving scan bar 16 forward across platen 12. This embodiment is not as advantageous as the first embodiment, because this embodiment requires more components (row of light sources 28, and possibly, photodetectors 13), which would increase manufacturing costs and product reliability problems. Also, there could be some "see through" problems with thin paper and light from the wrong light source being detected.

Figure 5:
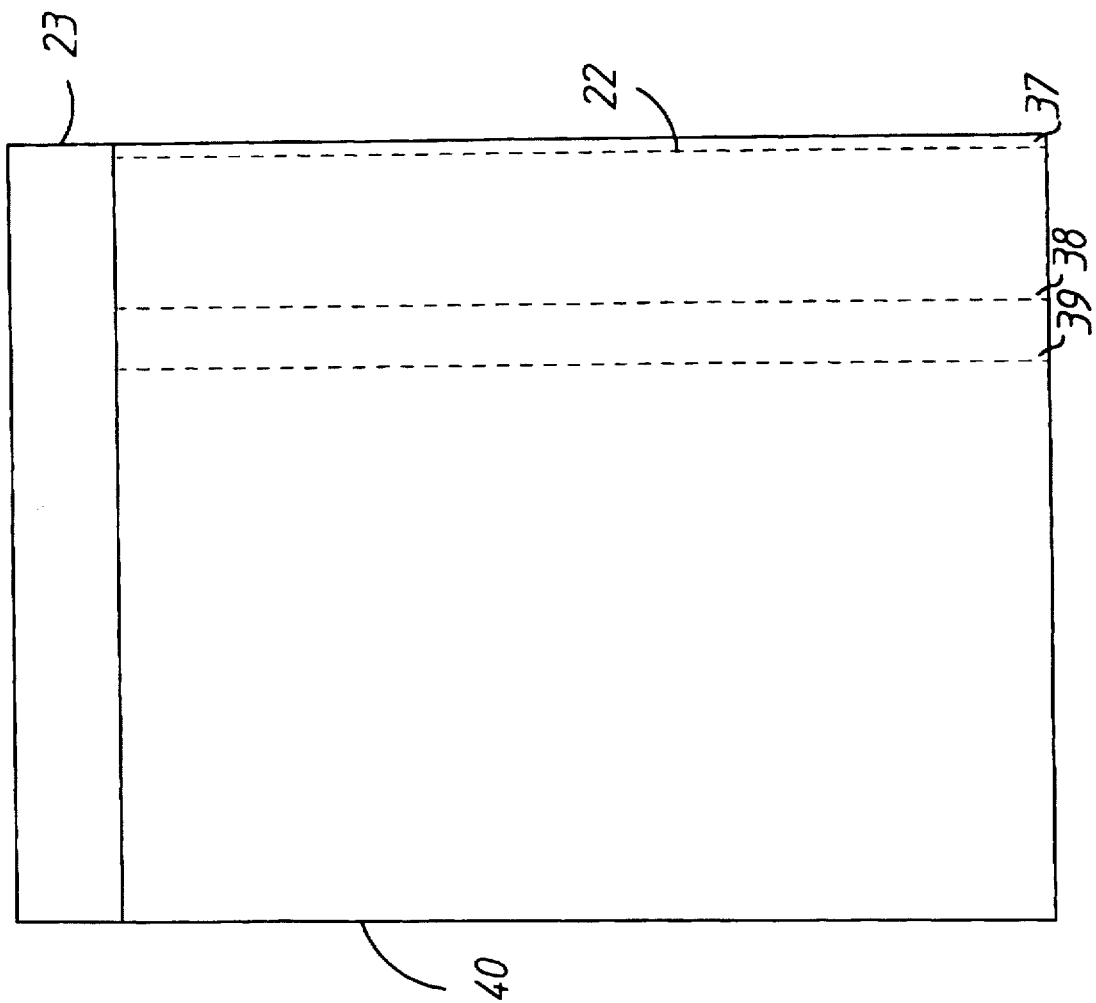
FIG. 5 shows a top view of a document tray for an automatic document feeder scanner according to a third embodiment of the present invention.
Figure 6:
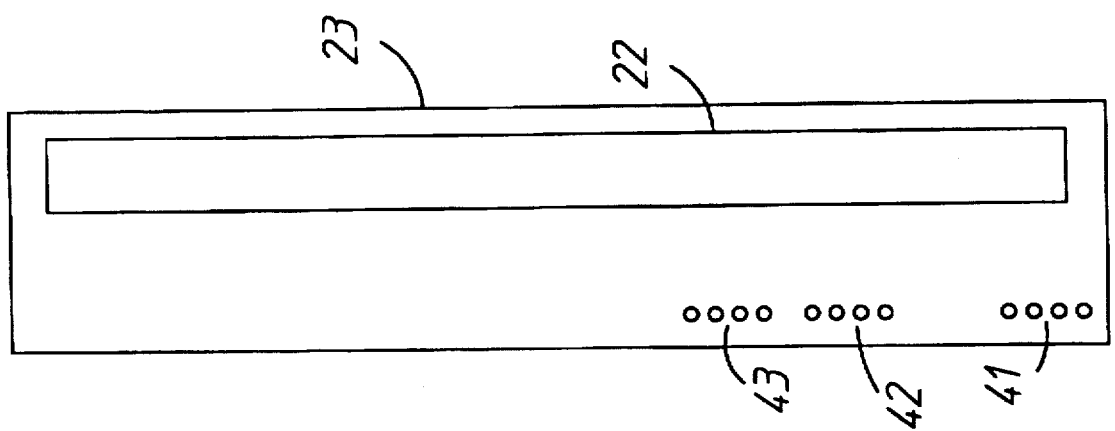
FIG. 6 shows a bottom view of an automatic document feeder according to the third embodiment of the present invention.
Figure 7:
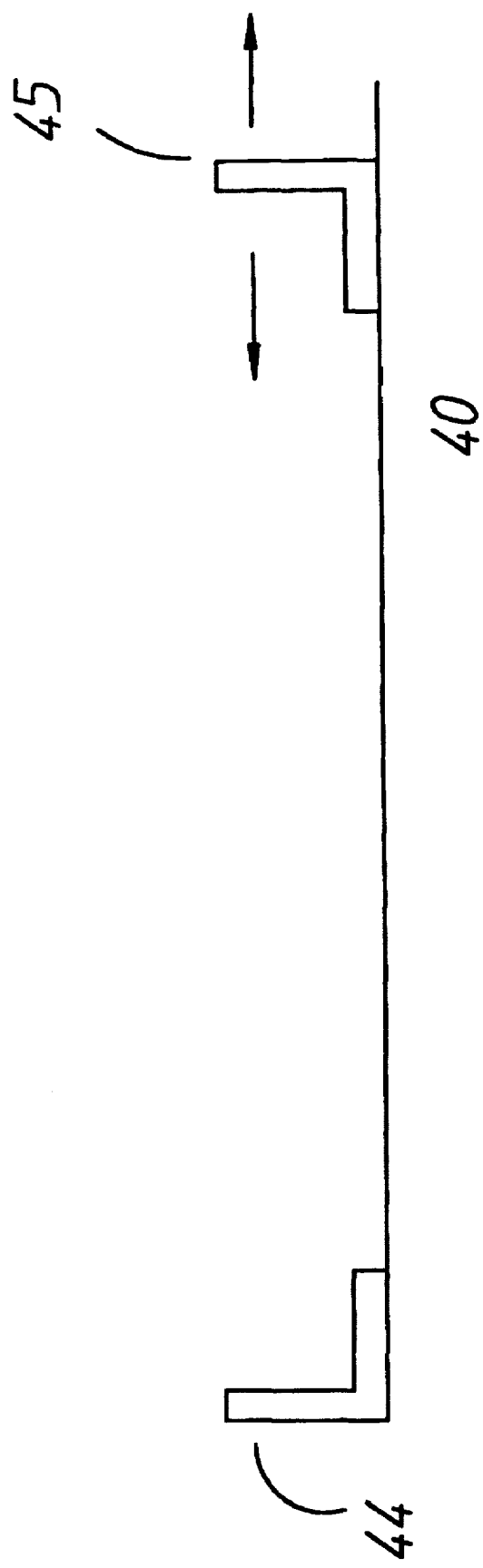
FIG. 7 shows a side view of a document tray for an automatic document feeder scanner according to the third embodiment of the present invention.

FIGS. 5–7 show a third embodiment of the present invention. Particularly, document handling tray 40 can be equipped with a stationary document guide 44 and a slidable document guide 45, as are well known in the art. There could either be discrete sensors along the path of the sliding document guide 45 or discrete sensors along the document path on carriage 23 conforming to standard paper sizes, such as 11×17 corresponding to guide position 37 and sensor position 41, 8½×11 corresponding to guide position 38 and sensor position 42 or A4 corresponding to guide position 39 and sensor position 43. This is the least advantageous embodiment as the sensors (41–43) would either have to extend along substantially the entire length of carriage 23 or the slide path of slidable document guide 45 or be located at common paper size positions. The first choice is expensive in terms of hardware and the second choice does not give the user any more choices with regards to scan area size than the current preprogrammed scanners with paper size selections. Accordingly, embodiment 1 with the yellow(or grey)/white code strip is the preferred embodiment in terms of cost, resolution, reliability and "see through" concerns.

The foregoing description of the invention has been presented for purposes of illustration and description. It is not intended to be exhaustive or to limit the invention to the precise embodiment disclosed, and other modifications and variations may be possible in light of the above teachings. For example, the method and apparatus of the present invention would work equally well for a scanner system that uses a moving-light document scanner. Also, although the present invention was described for a method and apparatus for detecting the document width, one skilled in the art would readily be able to modify the system to alternatively or simultaneously detect the document length. Moreover, the calibration strip could be any color other than white and the code strip could be white without departing from the basic theory of the present invention. The embodiment was chosen and described in order to best explain the principles of the invention and its practical application to thereby enable others skilled in the art to best utilize the invention in various embodiments and modifications as are suited to the particular use contemplated. It is intended that the appended claims be construed to include other alternative embodiments of the invention except insofar as limited by the prior art.

What is claimed is:

1. A document scanner having a document width detection system along a document scan line that has a predetermined width, said document width detection system comprising:

a color strip, said color strip extending substantially across the width of said document scan line and located along said document scan line;

a calibration strip which calibrates said document width detection system, said calibration strip extending substantially across the width of said document scan line and located substantially adjacent said color strip;

a light source extending substantially across the width of said document scan path, said light source directs a strip of light consisting of individual light pixels toward said color strip and said calibration strip;

a photodetector extending substantially across the width of said document scan path, said photodetector detects said strip of light after said strip of light has been reflected by said color strip or said calibration strip; and a controller, wherein a photoelectric signal created by said photodetector is received by said controller and the width of a document can be determined from said photoelectric signal if a document is placed between said color strip and said light source, if the width of a document is detected said controller turns off any light source pixels that are outside of the width of said document and initiates scanning.

2. The document width detection system according to claim 1, wherein said calibration strip is substantially white.

3. The document width detection system according to claim 2, wherein said color strip comprises any color other than white.

4. The document width detection system according to claim 2, wherein said color strip has a predetermined reflectivity and said calibration strip has a predetermined reflectivity, wherein said color strip is any color other than white having a reflectivity of approximately 95% of the reflectivity of said calibration strip.

5. The document width detection system according to claim 2, wherein said color strip has a predetermined reflectivity and said calibration strip has a predetermined reflectivity, wherein said color strip is a shade of grey having a reflectivity of approximately 95% of the reflectivity of said calibration strip.

6. The document detection system according to claim 2, wherein said color strip has a predetermined reflectivity and said calibration strip has a predetermined reflectivity, wherein said color strip is a coded strip of a shade of grey having a reflectivity of approximately 95% of the reflectivity of said calibration strip.

7. The document width detection system according to claim 2, wherein said color strip has a predetermined reflectivity and said calibration strip has a predetermined reflectivity, wherein said color strip comprises yellow having a reflectivity of approximately 95% of the reflectivity of said calibration strip.

8. The document width detection system according to claim 2, wherein said color strip has a predetermined reflectivity and said calibration strip has a predetermined reflectivity, wherein said color strip comprises a yellow coded strip having a reflectivity of approximately 95% of the reflectivity of said calibration strip.

9. The document width detection system according to claim 2, wherein said color strip comprises black.

10. A document scanner having a document detection system along a document scan line that has a predetermined width, said document detection system comprising:

a calibration strip for calibrating said document detection system, said calibration strip extending substantially along the width of said document scan line, said calibration strip having a predetermined reflectivity;

a color strip having a reflectivity of approximately 95% of the reflectivity of said calibration strip, said color strip extending substantially along the width of said document scan line;

a light source extending across the width of the document scan line, said light source directing a strip of light toward said color strip and said calibration strip;

a photodetector extending across the width of said document scan line, said photodetector detecting said strip of light after said strip of light has been reflected by said color strip or said calibration strip; and a controller, wherein a photoelectric signal created by said photodetector is received by said controller and the presence of a document can be determined from said photoelectric signal if a document is placed between said color strip and said light source, if the presence of a document is detected said controller initiates scanning.

11. The document detection system according to claim 10, wherein said calibration strip is substantially white and said color strip is substantially grey.

12. The document detection system according to claim 10, wherein said calibration strip is substantially white and said color strip is substantially yellow.

13. The document detection system according to claim 10, wherein said calibration strip is substantially white and said color strip is substantially black.

14. A document scanner having a document skew detection system along a document scan line that has a predetermined width, said document skew detection system comprising:

a calibration strip for calibrating said document skew detection system, said calibration strip extending substantially along the width of said document scan line, said calibration strip having a predetermined reflectivity;

a color strip having a reflectivity of approximately 95% of the reflectivity of said calibration strip, said color strip extending substantially along the width of said document scan line;

a light source extending across the width of the document scan line, said light source directs a strip of light toward said color strip and said calibration strip;

a photodetector extending across the width of said document scan line, said photodetector detects said strip of light after said strip of light has been reflected by said color strip or said calibration strip; and a controller, wherein a photoelectric signal created by said photodetector is received by said controller and a document's skew can be determined by said controller, if the measured skew becomes greater than a predetermined value said controller terminates scanning.

15. The document skew detection system according to claim 14, wherein said color strip is a grey code strip and said calibration strip is substantially white.

16. The document skew detection system according to claim 14, wherein said color strip is a yellow code strip and said calibration strip is substantially white.

17. A method for scanning a document comprising the following steps:

(a) directing light source having individual light pixels toward a color strip;

(b) reflecting said light with said color strip;

(c) receiving said light reflected by said color strip with a photodetector having individual photodetector pixels;

(d) converting said light received by said photodetector into a photoelectric signal;

(e) determining the presence and width of said document from said photoelectric signal;

(f) initiating the scanning process by turning on individual photodetector pixels that are determined to be inside the determined width of said document, turning off individual light source pixels that are determined to be outside of the determined width of said document, turning off individual photodetector pixels that are determined to be outside of the determined width of said document;

(g) scanning said document; and (h) returning to step (a).

18. The method for scanning a document according to claim 17 further comprising the following step after step (f):

determining said document's skew as said document is being scanned.

19. The method for scanning a document according to claim 18 further comprising the following step:

terminating the scan process if the skew of said document is greater than a predetermined value.

* * * * *